UNITED STATES PATENT OFFICE 2,220,952

PRODUCTION OF IMPROVED PIGMENTS

Harold C. Brill, Wilmington, Del., assignor to E. I. du Pont de Nemours & Company, Wilmington, Del., a corporation of Delaware No Drawing. Application April 1, 1938, Serial No. 199,441

17 Claims. (Cl. 134—58)

This invention relates to a process for the surface treatment of pigments. More particularly it relates to improved surface treated barium sulfate-extended titanium dioxide and barium sulfate-extended zinc sulfide pigments which are substantially non-caking in coating compositions.

Many pigments have poor suspension properties in certain of the common paint formulations particularly in glosses and enamels. This is especially true of barium sulfate-containing pigments, presumably because of the relatively high specific gravity and chemical inertness of barium sulfate. This poor suspension property results in settling and caking of the pigment in the bottom of the paint container upon standing and results in serious difficulties to the paint consumer as well as to the manufacturer. A great deal of research has been conducted in this field in an attempt to correct the aforementioned disadvantage. For instance, salts of fatty acids have been employed as treating agents for zinc sulfide pigments. Further, titanium pigments have been treated with such agents as aliphatic sulfonated oils as a means for improving the suspension properties of these pigments. However, in spite of the vast amount of research and in spite of the use of the aforementioned treating agents this objectionable settling and caking still persists in the common paint formulations possessing quality film properties.

I have found for instance in low pigment binder ratio (P/B) formulations such as floor enamels and other enamels having a short oil length varnish as the vehicle that all prior art barium sulfate containing pigments are seriously deficient in suspension properties. Said pigments in such formulations were found to settle to hard cakes often impossible to thoroughly incorporate by hand mixing. Although a large number of agents have been proposed and do improve suspension characteristics of pigments I have found that these agents have a deleterious effect on gloss characteristics and film hardness of paints and enamels. I have discovered one type of agent that is outstanding among all others tried in promoting the necessary suspension characteristics which I desire to impart to barium sulfate containing pigments. This agent is specific for barium sulfate and additionally, when used in the small proportions necessary, does not have adverse effects upon gloss and hardness of the resulting paint film.

This invention has as an object the preparation of surface treated pigments. A further object is the production of pigments whose surface is treated with a salt of a sulfonated aromatic petroleum. A still further object is the production of barium sulfate containing pigments of improved suspension properties, and non-caking characteristics and unimpaired gloss and flow properties when used in oil vehicles. Additional objects will become apparent from an examination of the following description and claims.

These objects are attained according to the herein described invention which broadly comprises adding a sulfonated aromatic petroleum salt to the pigment. By this I mean metallic salts of the sulfonated aromatic acid, however the salts of metals of Group I and II in the periodic arrangement of elements which form white hydroxide compounds are preferred.

In a more restricted sense this invention comprises adding between about .05% to about 1%, based upon the weight of the pigment, of an alkaline earth metal or alkali metal salt of a sulfonated aromatic petroleum. The treating agent may be produced by a metathetical reaction in the presence of the pigment or it may be separately prepared and added as such to the pigment.

The preferred embodiment of this invention comprises adding a suspension of between about .25% to about .50% based upon the weight of the pigment, of a barium or sodium salt of sulfonated aromatic petroleum to a barium sulfate-extended titanium dioxide or barium sulfate extended-zinc sulfide pigment. The barium salt is prepared as a suspension by adding an aqueous solution of an alkali salt of the sulfonated aromatic petroleum to a solution of a barium salt such as barium chloride. The barium salt is sparingly soluble and the resulting suspension can be washed by filtration or decantation to free it from the soluble alkali salt also formed by the interaction. The washing is optional but it is preferred as soluble salts in the pigment are usually to be avoided and I prefer to eliminate the soluble salts from the barium sulfonate suspension rather than wash the large quantity of pigment after the treatment. The suspension of the barium sulfonate can then be mixed into a pigment slurry after which the latter can be subsequently dewatered and dried. The barium sulfonate is the preferred agent for the extended titanium pigment.

This invention may be more readily understood by a consideration of the following examples which are given for illustrative purposes and are not intended to place any limitations on the herein described invention. In these examples I have given an arbitrary numerical grading for the suspension of pigments in paint. This grading system is defined as follows:

10=No cake; perfect suspension.
9=Very slight cake.
8=Definite cake; soft enough for a spatula to penetrate by its own weight.
7=Just possible to move spatula through cake sidewise.
6=Definite resistance to spatula when moved edgewise through the cake.
5=Just possible to move spatula edgewise through the cake.
4 and lower=practically impossible to incorporate the hard dry cake.

Example I

A suspension of barium sulfate extended titanium pigment was divided into seven portions and to each I added a suspension of the barium salt of sulfonated aromatic petroleum. The amount of the latter was selected so that the treatments varied from .05% to .50%. The pigments were then filtered, dried and after a pulverizing grind were incorporated into an enamel vehicle. The latter was a short oil length varnish containing a synthetic resin extended with natural gums such as customarily used in exterior enamels. These enamels were rated for suspension at intervals up to six months. The data are as follows:

*Suspension data*

|  | 3 days | 1 week | 4 weeks | 2 months | 6 months |
|---|---|---|---|---|---|
| Control—no treatment | 7 | 6 | 5 | 5 | 4 |
| Pigment+0.05% agent | 7 | 7 | 6 | 6 | 5 |
| Pigment+0.10% agent | 8 | 8 | 7 | 7 | 6 |
| Pigment+0.15% agent | 8 | 8 | 7 | 7 | 6 |
| Pigment+0.20% agent | 9 | 8 | 7 | 7 | 6 |
| Pigment+0.25% agent | 10 | 10 | 10 | 10 | 10 |
| Pigment+0.30% agent | 10 | 10 | 10 | 10 | 10 |
| Pigment+0.50% agent | 10 | 10 | 10 | 10 | 10 |

Treatments with .25% of the reagent similar to those described in the above example were made using the sodium salt of sulfonated aromatic petroleum and the barium salt of sulfonated aliphatic petroleum as the treating agents. The suspension properties in all cases were good. The latter reagent caused the pigment to show definitely poorer flow and poorer gloss in enamel paint film. The sodium salt of the sulfonated aromatic petroleum treatment yielded enamel film properties slightly poorer than those of the corresponding barium salt. I attribute this in part to the low solubility of the barium aromatic petroleum sulfonate and for the barium sulfate containing titanium pigments; I prefer to use the barium salt of sulfonated aromatic petroleum.

Example II

A finely ground lithopone slurry containing about 200 grams of pigment per liter was treated by the addition of the sodium salt of sulfonated aromatic petroleum in an aqueous solution. The latter was added in an amount equivalent to .25 gram of salt (dry basis) per 100 grams of pigment. The slurry was thoroughly mixed, filtered and dried. The pigment thus produced was disintegrated in the usual way and tested for suspension properties in a short oil length varnish containing a synthetic resin extended with natural gums. A similar pigmented composition was made with the untreated control and both were stored four months in a paint can. The can containing the untreated pigment showed a heavy cake in the can at the end of this time while that containing the treated pigment showed almost perfect suspension.

It is to be understood that the aforementioned examples are representative merely of the means of carrying out the present invention and are not intended to place any limitations of any kind on the scope of this invention.

The specific embodiments as well as the examples described herein may be varied widely without departing from the scope of this invention. For instance, the amount of reagent which is added can be varied within wide limits up to as much as 5% or more. An amount as small as .05% has a noticeable effect although my preferred range is from about 0.25% to about 0.5%. The percentages of the treating agent given herein are based upon the weight of the pigment.

While the barium and sodium salts of sulfonated aromatic petroleums are the preferred reagents it is to be understood that other bivalent metal and alkali metal salts of sulfonated aromatic petroleums will give greatly improved results over the prior art treatments. Some of these compounds approach the preferred reagents in effectiveness due to the imparting of certain characteristics to the pigments. These reagents include such salts as lithium, potassium, rubidium, caesium, calcium, strontium, cadmium, zinc, magnesium, and beryllium sulfonated aromatic petroleums.

Other variations in the addition of the reagent are possible. For instance, I may add an aqueous solution of a barium salt to a suspension of a barium sulfate base titanium pigment and subsequently add a water solution of a sulfonated aromatic petroleum. This results in precipitation of barium sulfonate in the presence of the pigment. A more intimate distribution of the sulfonate is thereby obtained but has the disadvantage that the soluble salt formed by the metathetical reaction remains with the pigments unless the latter is washed.

It is to be understood that this invention is applicable to such products as titanium, zinc sulfide, alkaline earth titanate and tinted titanium pigments as well as to the colored pigments, especially the barium sulfate extended pigments and the term "pigment" as used in the herein described disclosure and claims include such specific pigments. This invention is particularly applicable to the barium sulfate containing pigments especially to the titanium dioxide and zinc sulfide pigments.

In the preparation of barium sulfate, it is sometimes desirable to carry out the precipitation in the presence of an excess of the soluble barium salt for instance, $BaCl_2$. My invention is particularly adapted to such method of manufacture. I may add the solution of the sulfonated aromatic petroleum to the barium sulfate suspension and the barium sulfonate is immediately formed. If the various reactants in such a process are barium chloride, sodium sulfate, and the sodium salt of a sulfonated aromatic petroleum, the final result is a simple suspension of barium sulfonate treated barium sulfate in a sodium chloride solution. This barium sulfate is useful in the preparation of a blended pigment e. g. barium base titanium pigment. Such a product is extraordinarily good in the settling characteristics in the more dispersive paint vehicle and without a sacrifice in gloss and film hardness properties as is experienced when the prior art salts of sulfonated oils are used.

The herein described treatment has proven very effective in the elimination of settling and caking of the paint pigment and is therefore in this respect greatly superior to the prior art treatments. Further, my treating agents, the salts of sulfonated aromatic petroleum, are much more effective and only a small amount of agent is necessary to produce the improved results. Due to the fact that only a small amount of my agent is necessary other properties of the pigments are not altered to the same extent as they are when the prior art treating agents are employed. For example, the gloss, flow, and hardness, of paint films from such pigments are subtsantially equal to gloss, flow, and hardness, characteristics of the untreated pigments. Whereas, with other treating agents these properties are degraded to an important extent.

The sulfonated aromatic petroleum reagent referred to in this specification is obtainable from asphalt base petroleum such as that found in California. The cyclic portion is used in my invention after sulfation by methods well known in the art. Such compounds have been found to be quite different from similar compounds produced from paraffine base petroleum such as are found in the Eastern oil fields. The latter are aliphatic compounds in contrast to the cyclic or aromatic compounds which I have discovered to be highly effective in my pigment treating process. The salts of the sulfonated aliphatic petroleum are definitely inferior and are unsatisfactory as treating agents for suspension of pigments as disclosed above because of the effect of the agent on the properties of the resulting paint film. The paint or enamel surface lacks the desired gloss and smoothness and the film is definitely less hard when the aliphatic compound is used. The aromatic petroleum sulfonate is different in type and definitely superior.

As many apparently widely different embodiments of this invention may be made without departing from the spirit and scope thereof, it is to be understood that I do not limit myself to the specific embodiments thereof except as defined in the appended claims.

Having described the present invention the following is claimed as new and useful.

1. A process for producing improved pigments which pigments when incorporated in oil vehicles are substantially non-caking and produce a paint of unimpaired gloss and flow properties which comprises adding to the pigment between .05% and 5%, based on the weight of the pigment, of a metallic salt of a sulfonated aromatic petroleum.

2. A process for producing improved pigments which pigments when incorporated in oil vehicles are substantially non-caking and produce a paint of unimpaired gloss and flow properties which comprises adding to the pigment between .05% and 5%, based on the weight of the pigment, of a sulfonated aromatic petroleum salt selected from the class consisting of alkaline earth metal and alkali metal salts.

3. A process for producing improved pigments which pigments when incorporated in oil vehicles are substantially non-caking and produce a paint of unimpaired gloss and flow properties which comprises adding to a barium sulfate containing pigment between .05% and 5%, based upon the weight of the pigment, of a metallic salt of a sulfonated aromatic petroleum.

4. A process for producing improved pigments which pigments when incorporated in oil vehicles are subtsantially non-caking and produce a paint of unimpaired gloss and flow properties which comprises adding to a barium sulfate containing pigment between .05% and 5%, based upon the weight of the pigment, of an alkaline earth metal salt of a sulfonated aromatic petroleum.

5. A process for producing improved pigments which pigments when incorporated in oil vehicles are substantially non-caking and produce a paint of unimpaired gloss and flow properties which comprises adding to a barium sulfate containing pigment between .05% and 5%, based on the weight of the pigment, of an alkali metal salt of a sulfonated aromatic petroleum.

6. An improved pigment which pigment when incorporated in oil vehicles is substantially non-caking and produces a paint of unimpaired gloss and flow properties which comprises a pigment and between .05% and 5%, based on the weight of the pigment, of a metallic salt of a sulfonated aromatic petroleum.

7. An improved pigment which pigment when incorporated in oil vehicles is substantially non-caking and produces a paint of unimpaired gloss and flow properties which comprises a pigment and between .05% and 5%, based on the weight of the pigment, of a sulfonated aromatic petroleum salt selected from the class consisting of alkaline earth metal and alkali metal salts.

8. An improved pigment which pigment when incorporated in oil vehicles is substantially non-caking and produces a paint of unimpaired gloss and flow properties which comprises barium sulfate and between .05% and 5%, based on the weight of the pigment, of a metallic salt of a sulfonated aromatic petroleum.

9. An improved pigment which pigment when incorporated in oil vehicles is substantially non-caking and produces a paint of unimpaired gloss and flow properties which comprises barium sulfate and between .05% and 5%, based on the weight of the pigment, of a sulfonated aromatic petroleum salt selected from the class consisting of alkaline earth metal and alkali metal salts.

10. A process for producing improved pigments which pigments when incorporated in oil vehicles are substantially non-caking and produce a paint of unimpaired gloss and flow properties which comprises adding to a barium sulfate containing pigment between about .25% and about .50%, based on the weight of the pigment, of a barium salt of a sulfonated aromatic petroleum.

11. A process for producing improved pigments which pigments when incorporated in oil vehicles are substantially non-caking and produce a paint of unimpaired gloss and flow properties which comprises adding to a barium sulfate containing pigment between about .25% and about .50%, based on the weight of the pigment, of a sodium salt of a sulfonated aromatic petroleum.

12. An improved pigment which pigment when incorporated in oil vehicles is substantially non-caking and produces a paint of unimpaired gloss and flow properties which comprises a barium sulfate containing pigment and between about .25% and about .50% based on the weight of the pigment, of a barium salt of a sulfonated aromatic petroleum.

13. An improved pigment which pigment when incorporated in oil vehicles is substantially non-caking and produces a paint of unimpaired gloss and flow properties which comprises a barium sulfate containing pigment and between about .25% and about .50% based on the weight of the pigment, of a sodium salt of a sulfonated aromatic petroleum.

14. A process for producing improved pigments which pigments when incorporated in oil vehicles are substantially non-caking and produce a paint of unimpaired gloss and flow properties which comprises adding to a barium sulfate extended titanium dioxide pigment between about .25% and about .50%, based on the weight of the pigment, of a barium salt of a sulfonated aromatic petroleum.

15. A process for producing improved pigments which pigments when incorporated in oil vehicles are substantially non-caking and produce a paint of unimpaired gloss and flow properties which comprises adding to a barium sulfate extended titanium dioxide pigment between about .25% and about .50%, based on the weight of the pigment, of a sodium salt of a sulfonated aromatic petroleum.

16. An improved pigment which pigment when incorporated in oil vehicles is substantially non-caking and produces a paint of unimpaired gloss and flow properties which comprises a barium sulfate extended titanium dioxide pigment and between about .25% and about .50% based on the weight of the pigment, of a barium salt of a sulfonated aromatic petroleum.

17. An improved pigment which pigment when incorporated in oil vehicles is substantially non-caking and produces a paint of unimpaired gloss and flow properties which comprises a barium sulfate extended titanium dioxide pigment and between about .25% and about .50% based on the weight of the pigment, of a sodium salt of a sulfonated aromatic petroleum.

HAROLD C. BRILL.